United States Patent [19]

Stone et al.

[11] 4,267,228
[45] May 12, 1981

[54] METHOD FOR PRODUCING TEAR TAPE AND SEAL AND TEAR LINE FOR PACKAGING

[75] Inventors: Arnold F. Stone, Franklin; William D. Kinnard, Spring Hill, both of Tenn.

[73] Assignee: CPS Industries, Franklin, Tenn.

[21] Appl. No.: 72,961

[22] Filed: Sep. 6, 1979

Related U.S. Application Data

[63] Continuation-in-part of Ser. No. 13,577, Feb. 21, 1979.

[51] Int. Cl.³ ............... B32B 3/00; B32B 5/06; D02G 3/00; C09J 7/00
[52] U.S. Cl. ................ 428/297; 428/375; 156/296; 156/313; 156/176; 156/178
[58] Field of Search ............ 428/191, 200, 265, 267, 428/297, 343, 346, 349, 375, 392, 396, 361, 378, 394, 395; 427/434 D, 434 E; 156/180, 296, 313, 176, 178

[56] References Cited

FOREIGN PATENT DOCUMENTS 847849 7/1970 Canada .

OTHER PUBLICATIONS

Sep. 1977, V85, #2, Box Containers, pp. 54–55, "Coated String Adds Strength to Corrugated Bins".

Primary Examiner—John T. Goolkasian
Assistant Examiner—L. Falasco
Attorney, Agent, or Firm—Thomas H. Murray; Clifford A. Poff

[57] ABSTRACT

A hot-melt adhesive line and an article of manufacture including the same are made up of one or more bundles of fibrous strands (49% by weight) and hot-melt adhesive to effect interfibrous adhesion after heated dispersion throughout the fibers of the strands. The line has an extruded outer layer of compacted adhesive to enclose the strands of the bundle and to adhere by uniform spreading of the entire strand onto a container surface. Typically, 1000 strands of man-made material are included in a hot-melt adhesive line that is 0.024 inch in diameter. Adjoined, side-by-side strands provide tape one-half inch in width.

16 Claims, 9 Drawing Figures

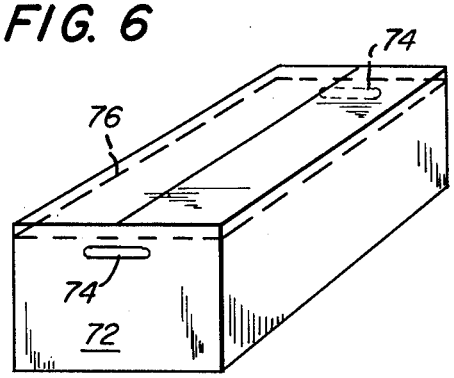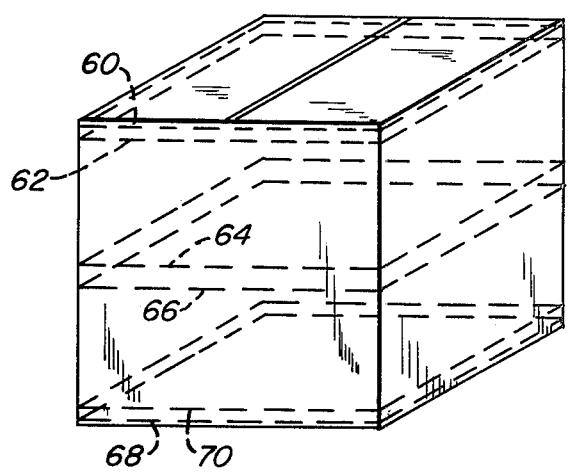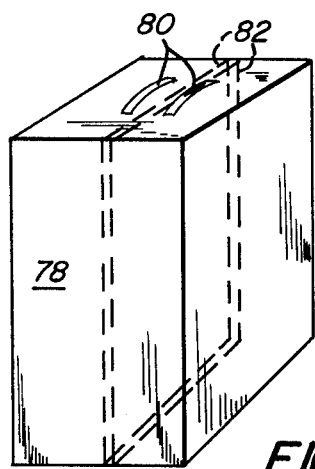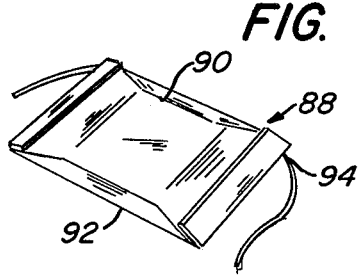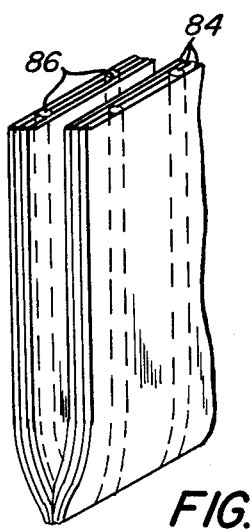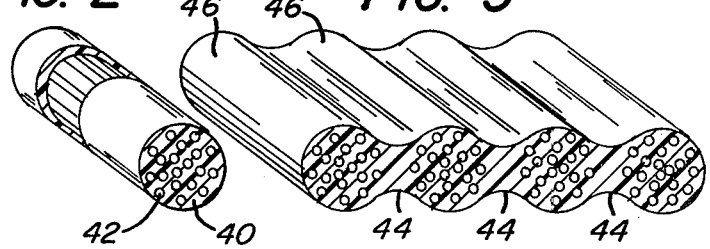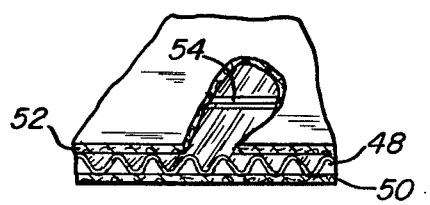

METHOD FOR PRODUCING TEAR TAPE AND SEAL AND TEAR LINE FOR PACKAGING

CROSS-REFERENCE TO RELATED APPLICATION

This application is a continuation-in-part of application Ser. No. 13,577, filed Feb. 21, 1979.

BACKGROUND OF THE INVENTION

This invention relates to a hot-melt adhesive line and an article of manufacture including the same to provide reinforcement, a tear line and/or seal line for packaging wherein the hot-melt adhesive line is comprised essentially of at least one bundle of fibrous strands and a sufficient amount of hot-melt adhesive for interstrand adhesion and for a compacted coating on the bundle of strands to form a predetermined shape to the line to undergo lateral spreading when reheated and under an applied force.

While not so limited, the hot-melt adhesive line of the present invention is particularly useful to reinforce and/or strengthen one or more walls of a packaging container and useful to form a package seal element and/or a tear element for opening a packaging container. Corrugated cartons used for packaging are cumbersome to reinforce from the standpoint of both expense and effectiveness. Stressed areas in a corrugated carton are usually reinforced by using heavy liners or a multi-wall construction. Not only are the stressed areas reinforced, but also the entire carton. As a result, unnecessary bulk and weight are added to the container. Such measures for reinforcing stressed areas of a carton also increase the cost without a significant improvement to the wet strength, bulge resistance, durability and loading strength.

To overcome these shortcomings and disadvantages, the present invention provides a hot-melt adhesive line and an article of manufacture including such line for packaging which dispenses with the need for expensive paper stock by utilizing high tensile strength filaments and hot-melt adhesive to add reinforcement to a corrugated container or the like either during the manufacturing process for the container or after manufacturing by the sample addition of heat to activate the thermoplastic adhesive for bonding after lateral spreading under an applied force at the desired site. In this way, reinforcement is readily achieved at critical stress points to adapt the carton for specific needs. Moreover, a package seal line is easily added and the same line may be used as reinforcement to absorb and spread compressive loads, shocks and stresses to enable the use of lower-weight liners without reducing the performance of the carton.

In copending application Ser. No. 13,577, assigned to the Assignee of this invention, there is disclosed a coating method that is used to produce the line of the present invention since the method provides a high production capacity and capability to produce the hot-melt adhesive line. The line has a compacted and shaped adhesive coating tightly adhered to fibrous yarn. Because of the nature of the product, fibrous yarn must be fed through a coating line at an economically feasible speed. However, the speed at which the coating process is carried out is dependent on variables including the type of yarn, material of the yarn and properties of the selected adhesive. This coating method is based on the discovery that the yarn must be preconditioned with respect to tension and cross-sectional shape immediately before coating with adhesive and within the very short residence time of the yarn in a bath of hot-melt adhesive. Absent such preconditioning of the yarn, there is an immediate stripping of any adhered coating in the bath because of the speed at which the yarn is pulled through the bath.

SUMMARY OF THE INVENTION

It is an object of the present invention to provide a novel hot-melt adhesive line and an article of manufacture including such adhesive line wherein the line is comprised essentially of at least one bundle of fibrous strands adhered interfibrously by the hot-melt adhesive with an extruded coating of such adhesive compacted and shaped to adhere onto a surface under an applied flattening force after reheating of the adhesive.

It is a further object of the present invention to provide a novel hot-melt adhesive line for strengthening and reinforcing containers as well as for use as a tear line and package seal on containers or packaging materials.

More particularly, the present invention provides a hot-melt adhesive line comprised essentially of at least one bundle of fibrous strands and a hot-melt adhesive in sufficient quantity to effect interfibrous adhesion through a heated dispersion throughout the fibrous strands, the line having a preselected shape defined by an extruded outer layer of compacted hot-melt adhesive enclosing the fibrous strands for adhesion onto a surface under an applied force sufficient to cause lateral spreading of both the hot-melt adhesive and bundle of fibrous strands from the preselected shape after reheating of the hot-melt adhesive. In the preferred aspect of the present invention, the fibrous strands are continuous in the bundle and comprised of yarn produced from man-made material. A plurality of bundles of the fibrous strands is, when desired, adjoined together in side-by-side relation to form a web-like tape.

The present invention further provides an article of manufacture consisting essentially of a container wall having at least one hot-melt adhesive line adhered thereto, the line being comprised essentially of at least one bundle of fibrous strands and a hot-melt adhesive in sufficient quantity to effect interfibrous adhesion through a heated dispersion throughout the fibrous stands, the line being laterally spread from a preselected shape defined by an extruded outer layer of compacted hot-melt adhesive enclosing the fibrous strands for adhesion onto a surface under an applied force sufficient to cause lateral spreading of both the hot-melt adhesive and bundle of fibrous strands after reheating of the hot-melt adhesive, the line being structurally incorporated with the container wall by adherence.

These features and advantages of the present invention as well as others will be more fully understood when the following description is read in light of the accompanying drawings, and in which:

FIG. 2 is an isometric view, partly in section, illustrating one embodiment of the hot-melt adhesive line according to the present invention;

FIG. 3 is a view similar to FIG. 2 but illustrating a further embodiment of the hot-melt adhesive line according to the present invention;

FIG. 4 is an isometric view, partly in section, of a corrugated cardboard wall of a container, partly in section, to illustrate one arrangement of the hot-melt adhesive line according to the present invention; and FIGS. 5-9 illustrate containers of various types and including the hot-melt adhesive line according to the present invention.

Figure 1:
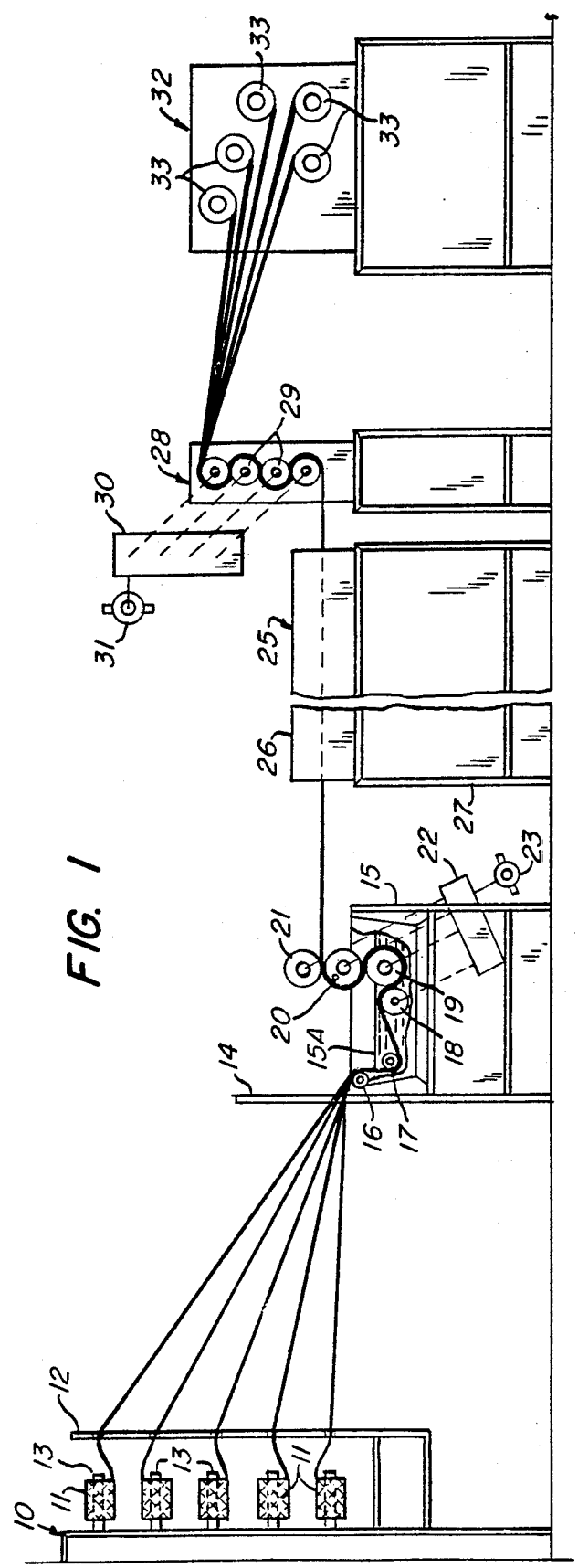
FIG. 1 illustrates one embodiment of the apparatus to produce the hot-melt adhesive line.

A preferred arrangement of the apparatus to produce the hot-melt adhesive line is shown in FIG. 1. The apparatus includes a creel 10 to pay-out a plurality of bundles of continuous filaments of yarn from spools 11 at vertically, spaced-apart locations through openings in a plate member 12. The creel includes the usual, well-known post member 13 extending horizontally and supporting the spools of yarn. It is preferred to use a man-made yarn made from high-grade polyester, nylon, rayon or glass with a denier and tensile strength selected to meet the required tensile strength of the package tape or line. The filaments or fibers are continuous and in bundled form on the spools. Fibers or monofilaments having lengths of between 4-8 inches may be reprocessed into continuous filaments in the bundles which are wound on the spools. As will be described hereinafter, the fibers of each bundle are coated with hot-melt adhesive. The tensile strength of yarn suitable for the intended result may be as low as 19 pounds per square inch and as high as 120 pounds per square inch.

In the drawings, the yarn from five spools thereof is drawn through vertically-spaced openings in plate 12 and fed under a nominal tension to a guide plate 14 having horizontally-spaced, yarn-receiving openings that transpose the strands of yarn into horizontally-spaced entry sites above a bath of hot-melt adhesive in a tank 15. The adhesive in tank 15 is maintained above the liquidus temperature thereof by heating elements submerged and/or embedded within the walls of the tank. The heating elements are coupled to a controlled power supply in a manner which is per se well known in the art to maintain the adhesive bath at a desired temperature. The bath temperature is dependent upon the particular adhesive with a softening point usually within the range of 90° F. to 463° F., but typically at 250° F. A suitable adhesive is currently supplied and available to the industry by Eastman Chemical Products, Inc. and Amsco Adhesives Division of Union Oil of California.

While a nominal tension is maintained in the yarn passed from plate 11 to plate 14, a controlled tension is maintained in each bundle of yarn during its passage within the bath of hot-melt adhesive. Moreover, the yarn of the bundles is subjected to further preconditioning at the initial entry site into the bath by contact with a guide roller 16 above the bath and a spreading roller 17 submerged in the bath. The strands or fibers of a bundle contact an arcuate segment of the roller 17 which has a convex face surface chosen to open up the bundle of strands or fibers to facilitate penetration of adhesive. Various devices, such as dies, may be used to achieve yarn preconditioning which includes a controlled tension. Depending upon the denier of the yarn, there is typically between 1000 and 1800 strands per bundle. The nominal diameter of the bundle in spool-form is 0.024 inch when made up of filaments having a diameter of $1.33 \times 10^{-5}$ inch. The selected denier of the fibrous bundle will typically fall within the range of 500 denier to 2200 denier to thereby provide a specific or desired tensile strength.

In FIG. 1, three nips are formed by four roller members 18, 19, 20 and 21 with aligned grooves along the face surfaces of at least rollers 18, 19 and 20, but preferably each of the rollers. Tension is maintained on the yarn by coupling the rollers to a suitable drive 22 which is, in turn, connected to a motor 23 having a speed controller to control the peripheral speed of the rollers and thereby control the tension imposed on the yarn. By maintaining the tension on the yarn at a desired level, typically within the range of 2.5 pounds to 3.5 pounds, complete contact and effective penetration of the adhesive with the fibrous structure of the yarn are achieved for high productive speed of operation. Tensioning of a specific poundage on the fibrous yarn facilitates complete penetration of adhesive throughout the yarn fibers. In a typical coating operation, increasing the velocity of the yarn through the bath will cause less adhesive penetration. Regulation of the tension by an indirect relation to the operating speed allows and makes possible complete penetration regardless of machine speed. For example: 3.02 pounds tension is necessary at running speeds of 200 feet per minute per yarn strand while at speeds of 300-400 feet per minute, a tension of 2.77 pounds is necessary. This tension change and speed change are accomplished by using a speed controller coupled to the machine via mechanical, if desired, and/or electrical connections. When a die or rollers 18-21 are used in the tank, the adhesive coating on the yarn is passed through either the opening in the die or through the grooves of the rollers to control the shape and the adhesive content to the coating on the yarn. The temperature of the rollers or dies is controlled by the flow of a heating or cooling liquid along internal passageways in a manner which is per se well known. The adhesive is compacted to an increased density by extrusion onto the bundle of yarn passing from tank 15. The nip formed by rollers 19 and 20 is above the surface 15A of the adhesive bath; while the nip formed by rollers 18 and 19 is submerged within the bath. As the strands pass from the bath around roller 21, the coating of adhesive thereon is in a semisolidified state and subjected to further extrusion by the nip formed by rollers 20 and 21. The coating on the strands undergoes chilling within a refrigerated cooling chamber 25. Chamber 25 is suitably in the form of a tunnel formed by a hood 26 supported on a base 27 used to carry refrigeration units for delivery of cooling air into the hood. The adhesive coating on the yarn is solidified in cooling chamber 25 and discharged to a chilling and forming station 28 where a stack of rollers 29 is arranged one above the other with horizontal axes of rotation. Four rollers 29 are shown each driven by a shaft coupled to a gear drive 30 which is, in turn, coupled to a motor 31. The adhesive-coated yarn passes to and fro between the nips formed by contacting rollers. The speed at which the rollers 29 rotate in relation to the speed at which rollers 18 and 21 rotate is controlled by the operation of motors 23 and 31 and is determinative of the delivery tension imposed on the yarn passing from the bath of hot-melt adhesive. A forward or upstream tension is determined and controlled by a nominal tension imposed on the yarn while passing between plates 11 and 14 as well as between rollers 16, 17 and 18. In this way, the tension on the yarn, while passing through the bath of hot-melt adhesive, is set and controlled so that the adhesive will penetrate and surround the fibrous structure of the yarn.

Returning now to the chilling and forming station 28, the rollers 29 may, if desired, have grooved surfaces along their faces thereof to form the cooled adhesive coating on the yarn into a desired shape. The coating on the yarn upon contact with the rollers is chilled by a substantial reduction to the temperature of the coating since the coating does retain residual heat at the discharge side of the refrigerated cooling chamber 25. If desired, the rollers 29 may be constructed so that their body portions join together, the individual strands of coated yarn to form a single tape or strand and thereby provide a package seal strip having a desired width. When so joined, the package seal strip takes the form of a tape comprised of laterally-spaced strands of yarn joined by the mutual adherence of the coating thereon.

Upon discharge from the chilling and forming station 29, the individual strands of yarn with the hot-melt adhesive coating thereon or a single web of adjoined strands, as the case may be, are fed to a coiling station 32 where a plurality of winders 33 is coupled to a suitable drive to coil the adhesive-coated yarn. When individual strands of yarn with the hot-melt adhesive coating thereon are fed to the coiling station, individual coilers form the strands into spools for convenient handling and shipping.

FIG. 2 illustrates an embodiment of the hot-melt adhesive line wherein the diameter thereof, according to a specific example, will fall within the range of 0.023 inch and 0.026 inch. An outer coating 40 resembling a sheathing, although not discrete from the adhesive adhered to the individual fibers and effecting interfibrous adhesion, will be between about 0.005 inch and 0.006 inch. About 49% by weight per unit length of the line is adhesive whereby 51% by weight per unit length represents the bundle of fibrous strands. The strands are identified in FIG. 2 by reference numeral 42. The strands each has a nominal tensile strength of about 19 pounds when a 1000-denier bundle of strands is used.

FIG. 3 illustrates an adjoined side-by-side relation of bundles of fibrous strands with hot-melt adhesive dispersed throughout the fibers of each bundle and the bundles joined together in side-by-side relation by thin web sections 44 comprised of hot-melt adhesive. Two or more hot-melt adhesive strands 46 may be joined together into web-like form or strip, there being four such strands shown in FIG. 4. The number of bundles of fibrous strands with hot-melt adhesive dispersed throughout and with a coating thereon may be selected to provide a tape that is one-half inch in width. Each strand may be 0.024 inch wide. By controlling the tension and the lateral spreading of the bundles entering the bath of hot-melt adhesive, a specific distribution of fibers into bundles is achieved and a width control for wide tape is acquired.

FIG. 4 illustrates one embodiment of an article of manufacture according to the present invention which includes the hot-melt adhesive line as described above. In FIG. 4, a layer 48 of a corrugated medium or fluting is adhered to one face surface of a liner board 50. The remaining face area of the fluting 48 is adhered to one face surface of a liner board 52. Between the fluting 48 and the liner board 52 there extends a hot-melt adhesive line 54 transverse to the corrugations of the fluting. The hot-melt adhesive line is used by reheating the adhesive content thereof to the softening point as given hereinbefore and then fed between the fluting and the outer liner during the assembly process of the cardboard. As the fluting and the outer liner are brought into contact with the reheated adhesive of the line, the adhesive undergoes cooling whereby the line adheres to both the fluting and the outer liner. This increases the bond between the fluting and the liner and, more importantly, reinforces the cardboard. During assembly of the cardboard, the liners are brought into contact with rollers under tension which imposes an applied pressure to the hot-melt adhesive line, causing spreading thereof. Lateral spreading of the line maximizes strengthening and reinforcement of the cardboard for its intended use as an article of manufacture forming a carton wall. Lateral spreading of the hot-melt adhesive line during application to a container wall whether incorporated within the cardboard as just described in regard to FIG. 4 or applied to a face surface of the cardboard, kraft paper, etc., increases the contact area therewith. It has been found that spreading of the heated hot-melt adhesive line is uniform so that there is lateral spreading of not only the compacted adhesive coating but also the bundle of fibrous strands with hot-melt adhesive dispersed throughout the strands. Stated differently, the reduction to the thickness of the hot-melt adhesive line under an applied pressure is uniform, whereby there is a thickness reduction to both, the compacted coating of adhesive and the fibrous strands. In a typical example, a hot-melt adhesive line having a nominal diameter of 0.024 inch is applied, after reheating, under a nominal pressure of 2 pounds at the application point where the line undergoes lateral spreading to a width of $\frac{1}{8}$ inch. This line had an adhesive content of 49%. The adhesive content of the line affects the spreading. Moreover, spreading is a function of the denier of the bundle of fibers, the selected adhesive and the percent of adhesive as well as heat and pressure at the application point. Typically, the fibrous tearing bond with a substrate produces an ASTM pull-away strength of 12.4 pounds per inch. The integrity of the adhesive after spreading remains effective for interfibrous adhesion.

FIG. 5 is intended to illustrate a standard 200-pound test carton for undergoing a standard ASTM compressive load test. The carton measures 12"×12"×12" and is made from cardboard having a 33-pound outer liner, a 26-pound fluting and a 33-pound inner liner. Such a standard test carton without the inclusion of a hot-melt adhesive line has a 2.7-inch deflection and a maximum compressive strength of 537 pounds. With the addition of a hot-melt adhesive line in the manner previously described in regard to FIG. 4 into a standard test carton, the compressive strength was materially increased. It was found that the compressive strength is increased to 725 pounds and deflection was increased to 3 inches when six strands of a hot-melt adhesive line were incorporated into each of the four side walls of the container. One length of a hot-melt adhesive line 60 is arranged one-half inch from the top of the carton and another line 62 is spaced one inch below line 60. Lines 64 and 66 are spaced one inch from the center line to the height of the carton. Line 68 is spaced one-half inch from the bottom of the carton and line 70 is spaced one inch above line 68. This addition of a hot-melt adhesive line to the test carton produced about a 26% improvement to the compressive strength of the carton. The adhesive line used for reinforcing the test carton had a weight of 0.61 pound per 1000 yards. Thus, the increase in weight to the carton due to the addition of a hot-melt adhesive line was less than 0.06 ounce and considered to be an insignificant weight increase.

FIG. 6 illustrates a container having side walls 72 with hand-holes 74 produced by openings therein. A selected length of a hot-melt adhesive line 76 is used to reinforce the container by arranging the line to extend about the side walls as shown in FIG. 6. The hot-melt adhesive line may take the form shown in FIG. 2 or 3 and arranged within the container wall in the manner already described in regard to FIG. 4.

FIG. 7 illustrates a still further use of the hot-melt adhesive line and an article of manufacture made therefrom having a reinforced and strengthened container wall. The container is made up of kraftboard or cardboard walls 78. The top wall of the container includes strap handles 80 attached thereto. The handles are spaced from one another by a suitably desired distance and between the handles there extends two spaced-apart and parallel lengths of hot-melt adhesive line 82. The lines 82 are extended along opposed end walls and the bottom wall of the container. The container is reinforced by the lengths of the hot-melt adhesive line to withstand the load imposed on the container by lifting and carrying the container and the content therein through the use of the handles 80. It is to be appreciated, of course, that the hot-melt adhesive line not only strengthens the container but reinforces the container against bulging either externally or internally under an applied force.

FIG. 8 illustrates packaging for loose material wherein the container has walls that are made from overlying sheets 84 of kraft paper and bonded together by a selected length of hot-melt adhesive line 86 adhered between the sheets. Depending upon the required strength and reinforcement, each of the usual three or five sheets of kraft paper may have a length of a hot-melt adhesive line interposed therebetween or simply a hot-melt adhesive line disposed between two of the kraft paper sheets forming the wall of the container. The line may extend horizontally about the packaging container to increase bulge resistance. The line may also extend vertically. Essentially, the container is made up of walls constructed in this manner and closed along peripheral edge margins by stitching or other means to form a compartment for loose material.

FIG. 9 illustrates an article of manufacture according to the present invention wherein a hot-melt adhesive line is attached to the face surface of packaging 88 to form a tear strip. The packaging 88 includes a cellophane blister portion 90 adhered to a backing wall 92. A length of hot-melt adhesive line 94 is adhered to the backing wall. Suitable instructions may be printed on the backing wall for applying the necessary stripping force to the length of hot-melt adhesive to thereby tear the backing wall along a strip defined by the adhered hot-melt adhesive line. It is to be understood, of course, that the hot-melt adhesive line may be applied to other surfaces of packaging to form a tear line. Such surfaces may be defined on any suitable material to which hot-melt adhesive will adhere with sufficient force to shear the packaging material without separation by stripping therefrom.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A hot-melt adhesive line comprised of at least one bundle of fibrous strands and a hot-melt adhesive in sufficient quantity to effect interfibrous adhesion throughout the fibrous strands, the fibrous strands of said bundle having a denier of between 500 and 2200, said line having a preselected shape defined by an extruded outer layer of compacted hot-melt adhesive enclosing the bundle of fibrous strands, said line being adapted to adhere to a surface under an applied force causing lateral spreading and a reduction in thickness of both the hot-melt adhesive and bundle of fibrous strands from said preselected shape after reheating of the hot-melt adhesive and under application of said applied force.

2. The hot-melt adhesive line according to claim 1 wherein said fibrous strands are continuous in the bundle.

3. The hot-melt adhesive line according to claim 1 wherein said fibrous strands are man-made.

4. The hot-melt adhesive line according to claim 1 wherein bundles of said fibrous strands with hot-melt adhesive dispersed throughout the fibers of each bundle are adjoined together in side-by-side relation by said extruded outer layer of adhesive in web-like form.

5. The hot-melt adhesive line according to claim 1 wherein the weight of said fibrous strands per unit length of line is about 51% of the weight of said hot-melt adhesive.

6. The hot-melt adhesive line according to claim 1 wherein said fibrous strands are comprised of fibrous yarn.

7. An article of manufacture consisting essentially of a container wall having at least one hot-melt adhesive line adhered thereto, said line being comprised of at least one bundle of fibrous strands and a hot-melt adhesive in sufficient quantity to effect interfibrous adhesion throughout the fibrous strands, the fibrous strands of said bundle having a denier of between 500 and 2200, said line being laterally spread from a preselected shape defined by an extruded outer layer of compacted hot-melt adhesive enclosing the fibrous strands for adhesion onto a surface under an applied force sufficient to cause lateral spreading and a reduction to the thickness of both the hot-melt adhesive and bundle of fibrous strands after reheating of the hot-melt adhesive, said line being structurally incorporated with the container wall by adherence.

8. The article of manufacture according to claim 7 wherein said fibrous strands are continuous in the bundle.

9. The article of manufacture according to claim 7 wherein said fibrous strands with hot-melt adhesive dispersed throughout said bundle are adjoined together in side-by-side relation by said extruded outer layer of adhesive in web-like form.

10. The article of manufacture according to claim 7 wherein said fibrous strands are man-made.

11. The article of manufacture according to claim 7 wherein said line is continuous along said container wall for reinforcement thereof.

12. The article of manufacture according to claim 7 wherein said container wall includes multilayers of a web, said line being adhered onto at least one of said multilayers of a web to reinforce and strengthen the container wall.

13. The article of manufacture according to claim 7 wherein said container wall includes a corrugated medium with said line adhered thereto.

14. The article of manufacture according to claim 7 wherein said container wall includes a facing web joined to a corrugated medium with said line adhered to either of said facing web or corrugated medium.

15. The article of manufacture according to claim 7 wherein said line defines a tear-tape on said container wall.

16. The article of manufacture according to claim 7 wherein said container wall includes corrugated board with said line adhered to component parts thereof.

* * * * *